(12) United States Patent
Kimmerly (10) Patent No.: US 8,060,865 B2
(45) Date of Patent: Nov. 15, 2011

(54) BUILD-TIME ENFORCEMENT OF ARCHITECTURAL PARTITIONING IN COMPUTER APPLICATION

(75) Inventor: Randy S. Kimmerly, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1465 days.

(21) Appl. No.: 11/330,643

(22) Filed: Jan. 12, 2006

(65) Prior Publication Data

US 2007/0162904 A1     Jul. 12, 2007

(51) Int. Cl.
*G06F 9/44* (2006.01)
(52) U.S. Cl. .................. 717/126; 717/104; 717/120
(58) Field of Classification Search .................. None
See application file for complete search history.

(56) References Cited

U.S. PATENT DOCUMENTS

| | | | | |
|---|---|---|---|---|
| 6,571,375 | B1 * | 5/2003 | Narain et al. ................ | 716/5 |
| 7,966,356 | B2 * | 6/2011 | Sangal et al. ................ | 707/829 |
| 2003/0120678 | A1 | 6/2003 | Hill et al. ................ | 707/102 |
| 2004/0015946 | A1 | 1/2004 | Te'eni ................ | 717/169 |
| 2004/0093593 | A1 | 5/2004 | Jhanwar et al. ................ | 717/169 |

FOREIGN PATENT DOCUMENTS

KR    2002-0022854    3/2002

OTHER PUBLICATIONS

Sangal, N., Jordan, E., Sinha, V., and Jackson, D. 2005. Using dependency models to manage complex software architecture. SIGPLAN Not. 40, 10 (Oct. 2005), 167-176. DOI= http://doi.acm.org/10.1145/1103845.1094824.*
Mecklenburg, Managing Projects with GNU Make, 3rd Edition, Nov. 19, 2004, O'Reilly Media, Inc., Excerpts from Chs. 1 & 3, 16 pages.*

* cited by examiner

*Primary Examiner* — James D Rutten
(74) *Attorney, Agent, or Firm* — Woodcock Washburn LLP (57) ABSTRACT

A computer software construct has a plurality of components and is built based on an architecture designed for the construct. The architecture includes a number of partitions and dependency rules, where each partition is for having at least one component associated therewith. Each dependency rule specifies whether a component of one partition may refer to any component of another partition. The method enforces the dependency rules of the architecture on each component of the construct as built. A command is received to build a particular component of the software construct based on corresponding build instructions, and the dependency rules are also received. Thereafter, it is determined whether the particular component of a particular partition violates any dependency rule by improperly referring to another component of another partition. The particular component of the software construct is built only if the particular component violates none of the dependency rules.

20 Claims, 4 Drawing Sheets

BUILD-TIME ENFORCEMENT OF ARCHITECTURAL PARTITIONING IN COMPUTER APPLICATION

TECHNICAL FIELD

The present invention relates to a system and method that enforces architectural partitioning in a computer application or the like. More specifically, the present invention relates to such a system and method that allows an architect or the like of such a computer application to specify partitioning rules with regard to the application, including permissible dependencies, and that enforces the specified partitioning rules.

BACKGROUND OF THE INVENTION

Computer applications, and relatively large-scale computer applications in particular, typically are constructed according to an architectural partitioning design that conceptually divides the application into logical groupings. As may be appreciated, such groupings serve to help in understanding the application in broad terms. As an example of such architectural partitioning, it may be the case that an application is divided into groupings, partitions, or areas of focus that include a user interface (UI), application logic, data storage, and the like.

Notably, an architectural partitioning design of a particular application may specify not only a number of partitions, but may also specify whether and how components of the application in each specified partition may refer to components of the application in other specified partitions. As may be appreciated, a reference within a first component to another, second component creates a dependency in the first component to the second component. As may also be appreciated, such references or dependencies may be useful and even necessary, but also may have the effect of tying together the components of the application in an unwanted and/or unwise manner. Thus, an architectural partitioning design for the application may specify that the first component if in a first partition can refer to the second component if in a second partition, but not to the second component if in a third partition.

As should be understood, by employing architectural partitioning according to logical groupings, and particularly in modular systems, adherence to the defined groupings and allowed dependencies allows for configuration agility. For example, and as may be appreciated, if application logic in an application is partitioned to be separate from the user interface in such an application, components that are employed to provide the application logic may more readily be employed in another application that may perhaps be similar in nature but that has a different user interface. Thus, and as a dependency rule, a component in an application logic partition should not depend on a component from a user interface partition for the reason that such a dependency would prevent the application logic from being employed with another user interface.

The theory and use of architectural partitioning is well-established with regard to a computer application. However, it is also well-established that given the opportunity to do so, a developer developing one or more components for the computer application may violate the architectural partitioning defined for the application, either intentionally or unintentionally. That is, applications, and especially the aforementioned relatively large-scale computer applications, tend to fall out of accordance with and diverge from the architectural partitioning that has been defined therefor.

In one typical example of such a divergence, an architectural partitioning design of a particular application may specify a rule that components in a first partition may refer to/depend on components in a second partition, but not components in a third partition. However, despite such a dependency rule, a developer developing the application in fact either intentionally or unintentionally violates same by developing a component in the first partition that refers to/depends on a component in a third partition. Put simply, placing a reference from one component to another is typically a simple thing to do, and no safeguards presently exist to inform the developer that a particular reference may violate a dependency rule and create a divergence.

In general, divergences occur primarily for the reason that the architecture of an application is typically designed and maintained separately from the application itself. Put simply, such architecture is not typically embodied in source code or any other memorialized form that could be used to actually build the application. Moreover, it is oftentimes the case that the architecture application is defined by one person or group of people and developed by another person or group of people. Thus, if a divergence occurs between an application as developed and the architecture defined for the application, no method or mechanism exists to identify the divergence, or to halt building of an application that has diverged from the architecture defined for such application.

Accordingly, a need exists for a method and mechanism that enforces the architectural partitioning defined for an application. In particular, a need exists for a method and mechanism that in fact identifies a divergence between an application as developed and the architecture defined for the application. Likewise, a need exists for a method and mechanism for halting building of an application that has diverged from the architecture defined for such application.

SUMMARY OF THE INVENTION

The aforementioned needs are satisfied at least in part by the present invention in which a method is provided with regard to a computer software construct having a plurality of components and built from an architecture designed for the construct. The architecture includes a number of partitions and dependency rules, where each partition is for having at least one component associated therewith. Each dependency rule specifies whether a component of one partition may refer to any component of another partition.

The method is for enforcing the dependency rules of the architecture on each component of the construct as built. In the method, a command is received to build a particular component of the software construct based on corresponding build instructions, and the dependency rules are also received. Thereafter, it is determined whether the particular component of the software construct and of a particular partition violates any dependency rule by improperly referring to another component of another partition. The particular component of the software construct is built only if the particular component violates none of the dependency rules.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 1 is a block diagram representing a general purpose computer system in which aspects of the present invention and/or portions thereof may be incorporated.

DETAILED DESCRIPTION OF THE INVENTION

Computer Environment

Figure 1:
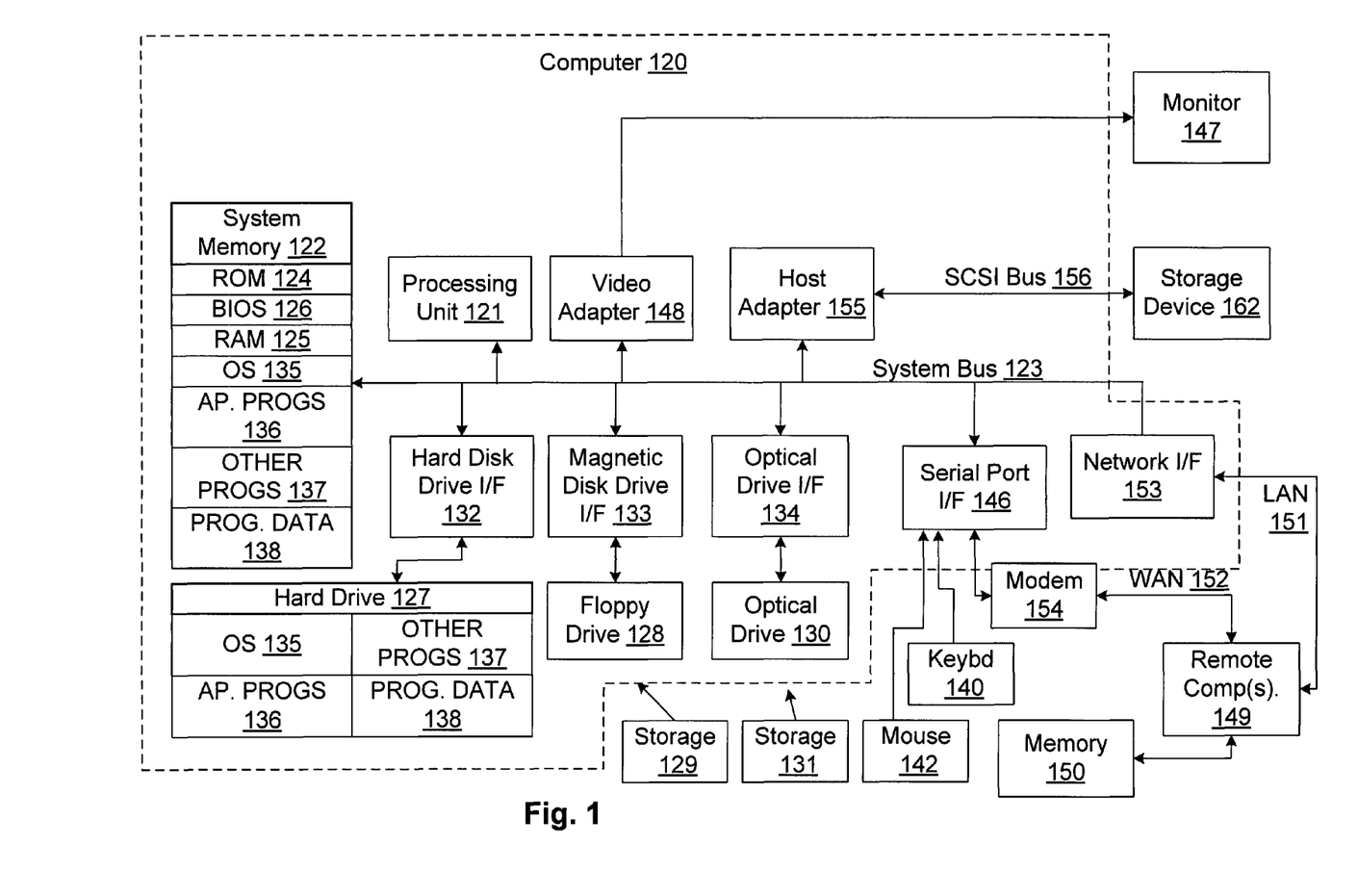

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet. The personal computer 120 may also act as a host to a guest such as another personal computer 120, a more specialized device such as a portable player or portable data assistant, or the like, whereby the host downloads data to and/or uploads data from the guest, among other things.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Build-Time Enforcement of Architectural Partitioning

In the present invention, architectural partitioning is defined for an application, including a number of partitions and whether and how components of the application in each specified partition may refer to components of the application in other specified partitions, and it is ensured that the application is in fact constructed within such architectural partitioning definition. In particular, in the present invention, a method and mechanism are provided to enforce partitioning rules of an architecture of an application, where such method and mechanism are operated during build-time when each component of the application is built. Thus, the architecture of the application is enforced and the application is prevented from diverging from the architecture defined therefor. If in fact such divergence is detected, building of the component is halted and the developer of the component is informed so as to be given the opportunity to correct such divergence.

Note that the application and architecture of such application for which architectural partitioning is defined may be any application and architecture without departing from the spirit and scope of the present invention. Designing and defining such application and architecture is known or should be apparent to the relevant public and therefore need not be set forth herein in any detail. Note, too, that in designing and defining such application and architecture, each partition of such architecture may be defined in any appropriate manner without departing from the spirit and scope of the present invention. For example, each partition may be defined so that partitions are one-dimensional or multi-dimensional, and each partition may be defined based on criteria such as functionality, security, communications, and/or the like.

Figure 2:
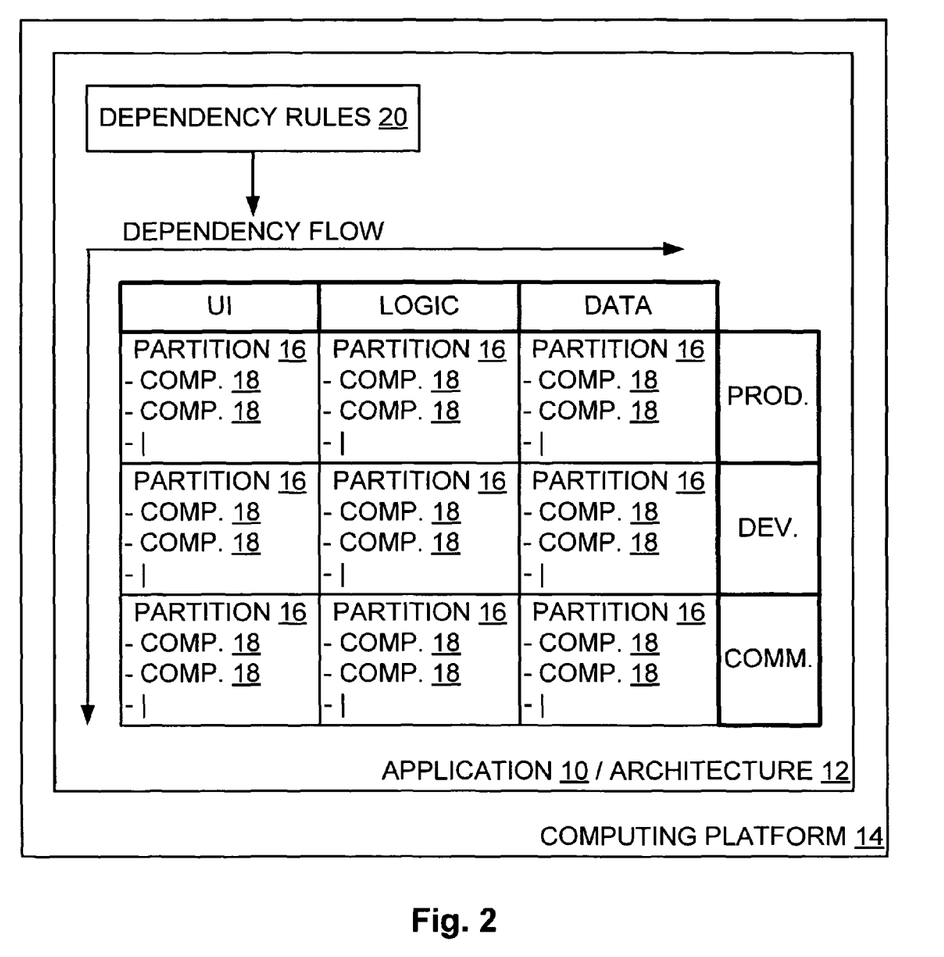
FIG. 2 is a block diagram of an example of an application and architecture thereof, where the application is to be built in accordance with one embodiment of the present invention to be instantiated on a computing platform.

Turning now to FIG. 2, it is seen that an example of an application 10 and architecture 12 thereof is shown, where the application is to be instantiated on a computing platform 14. Note here that the computing platform 14 may comprise a single computing device or multiple networked computing devices. In the latter case, the multiple networked computing devices may be organized in any appropriate manner without departing from the spirit and scope of the present invention. For example, it could be that different computing devices of the platform 14 are dedicated to different partitions 16 of the architecture 12, or that such different computing devices correspond to multiple such partitions 16.

At any rate, and still referring to FIG. 2, it is seen that the application 10 shown in the example is organized into an architecture 12 that has a plurality of horizontal layers and vertical slices that overlap to form a lattice or grid where each cell of the grid may be considered to be a separate partition 16. Although not shown, an architecture 12 such as that of FIG. 2 may include any number of additional dimensions as appropriate. As may be appreciated, each partition 16 is to be constituted as one or more components 18 when the application 10 is built. As should be understood, each component 18 of or 'within' a particular partition 16 should in fact be related to the purpose of such partition 16 as defined according to the architecture 12 for the application 10.

Each such component 18 may be any appropriate component 18 and type of component 18 without departing from the spirit and scope of the present invention. Defining components 18 of an architecture 12 is generally known or should be apparent to the relevant public and therefore need not be set forth herein in any detail. For example, if the application 10 is to be built as a single logical file or the like, each component 18 may be an appropriate logical section that is to be compiled or otherwise included within the file of the application 10. Likewise, if the application is to be built as a plurality of logical files or the like, each component 18 may be a plurality of such files, an individual file, or a portion of an individual file.

In the latter case, and as is typically the case, each component 18 may correspond to a particular file or the like, where such files include data files, executable files, library files, etc. As may be appreciated, each such component 18/file may be developed by one or more developers as a set of source code or the like that is compiled or otherwise built into the component 18/file by way of an appropriate build process or builder.

In the architecture 12 shown in FIG. 2, it is seen that the horizontal layers of the architecture 12 correspond to the general applicability of components 18 within the application 10, such as product, development tools, and common tools. Likewise, it is seen that the vertical slices of the architecture 12 correspond to top-level functionality groupings of components 18 across the application 10, such as user interface (UI), logic, and data. Thus, each intersection of a horizontal layer and a vertical slice within the architecture 12 of the application 10 may represent a partition 16 with one or more components 18, where each such component 18 within such partition has a shared general applicability and a shared top-level functionality. For example, and as shown in FIG. 2, the intersection of the product layer and the logic slice is a product-logic partition 16 with one or more components 18 therein that relate to logic and the product of the application 10.

Alternatively, each layer or slice within the architecture 12 may itself be considered a partition 16, where the slices represent the partitions of a first partition strategy and the layers represent the partitions 16 of a second partition strategy that coexists with the first partition strategy. In such case, each component 18 resides both within a particular partition 16 of the first partition strategy and within a particular partition 16 of the second partition strategy. More generally, then, it is to be appreciated that partitions 16 and partition strategies may be defined in any appropriate manner without departing from the spirit and scope of the present invention.

Notably, in addition to defining partitions 16 and perhaps partition strategies, an architectural partitioning design may also define dependency restrictions or rules 20 that are put in place to govern whether and how any component 18 in a particular partition 16 of the application 10 may be referred to by any other component 18 in another particular partition 16 of the application 10. As but one example of such dependency rules 20, and still referring to FIG. 2, it is seen that permitted dependencies in the architecture 12 shown flow from left to right across the horizontal layers and flow downward through the vertical slices. That is, a component 18 in the UI-product partition 16 may refer across to a component 18 in the logic-product partition 16, but a component 18 in the logic-product partition 16 may not refer across to a component 18 in the UI-product partition 16. Similarly, a component 18 in the data-product partition 16 may refer down to a component 18 in the data-common partition 16, but a component 18 in the data-common partition 16 may not refer up to a component 18 in the data-product partition 16.

Of course, the dependency rules 20 for any particular architecture 12 of an application 10 may be any appropriate dependency rules 20 without departing from the spirit and scope of the present invention. In one typical example where one-way flow is specified, such rules 20 may require that components 18 in each partition 16 may only refer to components 18 in an immediately adjacent partition 16 downstream, flow-wise. For another example, such rules 20 may refer to particular partitions 16 or ranges of partitions 16 and specify particular flows of dependencies that are allowed with regard to such referred partitions 16.

Note that although a particular dependency rule 20 may merely define a prohibited partition 16 that cannot be referred to from a particular partition 16 under any circumstances, such particular dependency rule 20 may also define such a prohibited partition 16 in a conditional manner, such as for example based on the purpose of the reference from the particular partition 16. As may be appreciated, the particular method and mechanism for defining such dependency rules 20 may be any appropriate method and mechanism without departing from the spirit and scope of the present invention. For example, such dependency rules 20 may be specified within a dependency file or script or the like according to a pre-defined dependency definition language, or may be specified as a set of attributes or the like.

As was pointed out above, although an architecture 12 including partitions 16 and dependency rules 20 such as that shown in FIG. 2 may be defined for an application 10, a developer developing a particular component 18 for the application 10 is not constrained from violating such architecture 12, either intentionally or unintentionally. In particular, during developing of such a component 18, such a developer is not prevented from creating a dependency on another component 18, where the created dependency violates the dependency rules 20 by diverging from same.

Accordingly, in one embodiment of the present invention, if a developer develops a component 18 that violates the dependency rules 20 of an architecture 12 for an application 10, an attempt to build the component 18 for the application 10 fails. Thus, the developer must alter the component 18 to be in conformity with the dependency rules 10 and retry to build such component 18 for the application 10.

In the prior art, a builder was provided to build each component 18 of the application 10 based on build instructions that were submitted with source code or the like for the component 18. Such a builder building such components 18 is known or should be apparent to the relevant public. However, the builder of the prior art did not at all refer to any dependency rules 20 or otherwise confirm that the component 18 being built does not violate such dependency rules 20.

Figure 3:
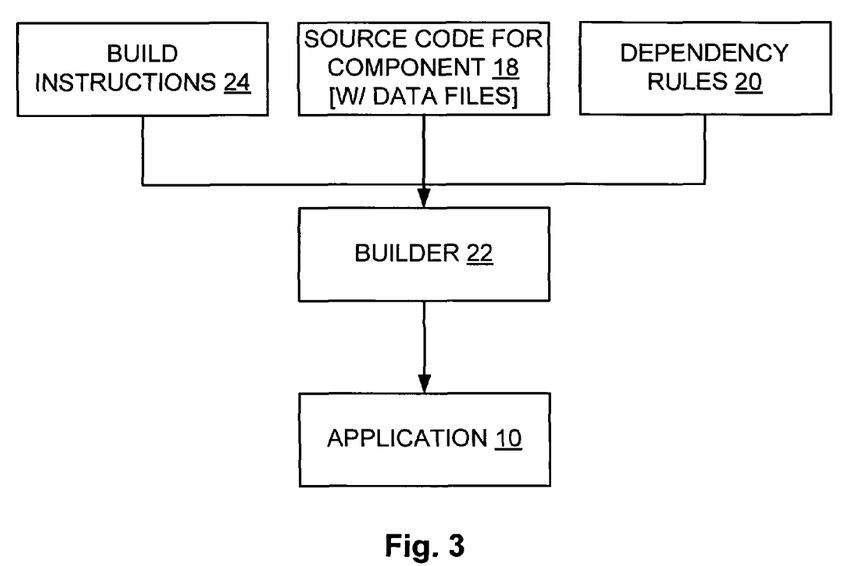
FIG. 3 is a block diagram of a builder for building the application of FIG. 2 in accordance with one embodiment of the present invention.

Thus, and turning now to FIG. 3, in one embodiment of the present invention, a build process or 'builder' 22 is provided to build each component 18 of the application 10 based on source code or the like for the component 18, a set of build instructions 24, and also based on the dependency rules 20. Thus, the builder 22 upon being requested to build the application 10 first confirms that each component 18 thereof does not violate the dependency rules 20.

If the builder 22 does not find any violations of the dependency rules 20 in a component 18 to be built, the builder 22 in fact builds and outputs the component 18 based on the build instructions 24 therefor, presuming of course no other issues exist that would prevent the builder 22 from building the component 18. If however, the builder does find any violations of the dependency rules 20 in the component 18, the builder 10 refuses to build such component 18, and instead may issue a report or the like detailing each violation of the dependency rules 20. Thus, a developer or the like of the component 18 may review the report and attempt to remedy each violation detailed therein. Once each violation is remedied, then, the developer may again request the builder 22 to build the component 18.

As was alluded to above, a builder 22 building components 18 of an application 10 based on build instructions 24 is known or should be apparent to the relevant public and therefore need not be set forth herein in any detail. Typically, although not necessarily, the builder 22 upon being executed is provided with the build instructions 24, perhaps in the form of a project file or the like. Based on the build instructions 24, then, the builder 22 locates all the source code or the like needed to build the component 18, and in fact builds the component 18 according to directives contained within the build instructions 24. Note that in addition to referring to the source code or the like for the component 18, the build instructions 24 may also refer to other objects, including objects that define attributes of the component 18, objects that provide methods to be used in building the component 18, objects that provide conditions, and the like. Alternatively, the contents of at least some of such objects may be included within the build instructions 24. Generally, such build instructions 24 are known or should be apparent to the relevant public, and therefore need not be set forth herein in any detail. Accordingly, any appropriate form of build instructions 24 may be employed without departing from the spirit and scope of the present invention.

Thus, it should be appreciated that the functionality employed by such a builder 22 to in fact build a component 18 of an application 10 based on such build instructions 24 may be any appropriate functionality without departing from the spirit and scope of the present invention. However, and as should be understood, the present invention resides at least in part on such builder 22 upon being requested to build a component of an application 10 first confirming that the component 18 does not violate dependency rules 20 set for the architecture 12 of the application 10.

Figure 4:
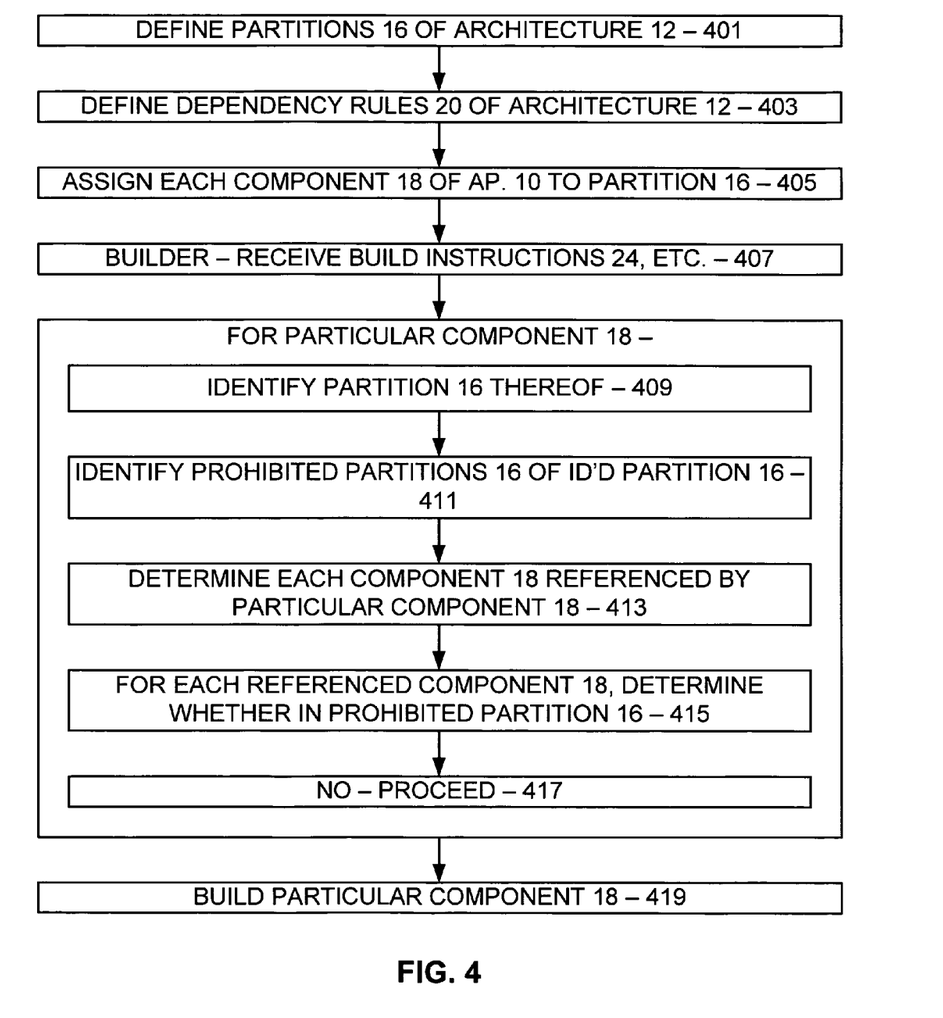
FIG. 4 is a flow diagram showing key steps performed by the builder of FIG. 3 prior to building the application of FIG. 2, where the builder determines whether components of the application of FIG. 2 satisfy the partitioning of the architecture of FIG. 2 in accordance with one embodiment of the present invention.

Turning now to FIG. 4, a method is shown to build a component 18 of an application 10 and in so doing to confirm that the component 18 does not violate corresponding dependency rules 20 set for the architecture 12 of the application 10, thus enforcing the architectural partitioning designed for the application 10 and set forth in the dependency rules 20 of the architecture 12 of such application 10. Preliminarily, and as may be appreciated, an architect must define an architectural partitioning design for the architecture 12 of the application 10 to include a number of partitions 16 (step 401). As should now be appreciated, and presuming for now that a single partitioning strategy is intended, the architectural partitioning design for the architecture places each component 18 of the application 10 into one of the plurality of defined partitions 16. Significantly, each component 18 of the application 10 must be associated with one and only one partition 16.

In addition, the architect must define the architectural partitioning design for the architecture 12 of the application 10 to include dependency rules 20 that are to be followed by each component 18 in each partition 16 of the architecture 12 (step 403). As should now be appreciated, such dependency rules 20 specify dependency restrictions between partitions 16 such that for each particular partition 16 in the architecture 12, other partitions 16 are identified as not to be referred to from the particular partition 16. Put another way, the dependency rules 20 define for each particular partition 16 other partitions 16 that are not to be accessed by way of the particular partition 16. As was alluded to above, such dependency rules 20 are not only for the benefit of a developer developing components 18 for the partitions 16 of the architecture 12 of the application 10, but also for the builder 22 to refer to in the course of enforcing the dependency rules 20 and the architectural partitioning design thereof.

Once the partitions 16 and the dependency rules 20 are defined, each component 18 of the application 10 must be assigned to a particular partition 16 (step 405). Notably, such assignment must be recorded or otherwise memorialized in a manner so that the assignment is accessible to the builder 22 so that such builder 22 can enforce the dependency rules 20. Achieving such assignment may be performed in any appropriate manner without departing from the spirit and scope of the present invention. For one example, such assignment may be specified for each of at least some of the components 18 in the build instructions 24 that are provided to the builder 22 along with the components 18 and the dependency rules 20. For another example, such assignment may be specified for each of at least some of the components 18 within the component 18, perhaps as an attribute thereof. For still another example, such assignment may be specified for each of at least some of the components 18 as part of a data file corresponding to the component 18. In the last example, and as should be appreciated, each such data file must be provided to the builder 22 along with the components 18, the build instructions 24, and the dependency rules 20.

Note that at least some of the options for specifying an assignment of a component 18 to a partition 16 likely require that the developer developing the component 18 perform the specifying action, such as for example including the assignment within the component 18. Thus, a developer could perhaps opt to omit specifying the assignment in an effort to avoid the bother. In an effort to overcome such a situation, and in one embodiment of the present invention, the builder 22 as part of confirming that each component 18 of an application 10 does not violate dependency rules 20 set for the architecture 12 of the application 10 may require an assignment of each component 18 to a corresponding partition 16. Thus, if the builder 22 cannot find an assignment for a particular component 18, the build will fail.

At any rate, assuming now that an assignment for a particular component 18 of an application 18 is specified and can be found, and also assuming that the source code or the like for the particular component 18 has been developed, the builder 22 confirms that the dependency rules 20 are not violated with regard to the particular component 18 in the following manner. As may be appreciated, the process at the builder begins with a submission to the builder 22 of, at a minimum, a set of build instructions 24 (step 407), where such build instructions 24 include where to obtain the source code or the like for the particular component 18, any corresponding data file, and the dependency rules 20. Alternatively, such source code or the like for the component 18, any corresponding data file, and the dependency rules 20 are submitted as necessary.

Thereafter, for the particular component 18, the builder 22 identifies the partition 16 thereof (step 409), either from the build instructions 24, the source code or the like of the component 18, any data file, or whatever other source may be employed, and reviews the dependency rules 20 to identify prohibited partitions 16, components 18 of which are not to be referenced by the particular component 18 (step 411). The builder 22 then determines each component 18 referenced by the particular component 18 in an appropriate manner (step 413), such as for example by way of a specific section within the source code or the like or else by reviewing each line of the source code or the like. For each referenced component 18, then, the builder determines whether the referenced component 18 is in a prohibited partition 16 (step 415). If every referenced component 18 is properly referenced by the particular component 18 according to the dependency rules 20, then, the builder proceeds (step 417). Otherwise a violation is found and the process may be halted and an appropriate report may be issued. Alternatively, the process may be allowed to continue after a violation flag or the like has been set, whereby other violations may be found if present.

As may be appreciated, assuming the process is not halted, the process continues for each referenced component 18 of the particular component 18. If all referenced components 18 are found by the builder 22 to conform to the dependency rules 20, then, the builder proceeds. In particular, if a violation flag is employed, the builder 22 determines whether such violation flag is set. If so, the process halts so that the particular component 18 is not built, and an appropriate report may be issued. If not, the builder 22 in fact proceeds by building the particular component 18 of the application 10 based on the source code or the like thereof and according to the build instructions 24 (step 419), presuming of course no other issue has been found by the builder 22 that would prevent such building of such component 18.

As was previously noted, if the builder 22 does find a violation of the dependency rules 20, the builder 10 in issuing a report or the like details each violation of the dependency rules 20. Thus, a developer or the like of the application 10 and/or the particular component 18 thereof may review the report and attempt to remedy each violation detailed therein. Once each violation is remedied, then, the developer may again request the builder 22 to build the particular component 18 of the application 10 according to steps 407 et seq. of FIG. 4.

CONCLUSION

Although the present invention is especially useful in connection with an application 10 such as a large-scale application built from components 18, the present invention may be practiced with regard to any appropriate application 10, all without departing from the spirit and scope of the present invention. Moreover, although the present invention has been disclosed in terms of an architecture 12 for an application 10, the present invention may be practiced with regard to the architecture of any other type of computer or network software construct or object constructed from components 18. Accordingly, the present invention is to be interpreted to encompass any type of computer or network software construct or object constructed from components 18, where each component 18 is developed according to a defined architecture 12 that specifies partitions 16 and dependency rules 20 regarding the partitions 16 for the object of which the component 18 is a part.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism that enforces the architectural partitioning of an architecture 12 defined for an application 10. The method and mechanism identifies any divergence between the application 10 as developed and the architecture 12 defined for the application 10, and halts building of the application 10 if divergent from the architecture 12 defined for such application 10. It should be understood, therefore, that this invention is not limited to the particular embodiments disclosed, but it is intended to cover modifications within the spirit and scope of the present invention as defined by the appended claims.

The invention claimed is:

1. A method with regard to a computer software construct having a plurality of components and built according to an architecture designed for the construct, the architecture including a number of predefined partitions and predefined dependency rules, each partition corresponding to one of a plurality of partition strategies for having at least one component associated therewith, each dependency rule regarding whether a component of one partition may refer to any component of another partition, the method for enforcing the dependency rules of the architecture on each component of the construct as built, and comprising:

assigning each component of the plurality of components to a particular partition of the predefined partitions of each of the plurality of partition strategies using a required specifying action to specify the assignment, each component assigned to one and only one partition of each of one or more of the plurality of partition strategies;

recording the assignment of each component;

receiving a command to build a particular component of the software construct based on corresponding source code, build instructions, and the predefined dependency rules;

determining whether the assignment of the particular component to the particular partition is properly specified;

determining whether the particular component of the software construct and of a particular partition violates any predefined dependency rule by improperly referring to another component of another partition; and building the particular component of the software construct only if the particular component has been assigned to one and only one partition of each of one or more of the plurality of partition strategies and the assignment of the particular component is properly specified and only if the particular component violates none of the dependency rules.

2. The method of claim 1 with regard to a software construct comprising a computer application.

3. The method of claim 1 as performed by a builder building the particular component of the software construct based on the build instructions.

4. The method of claim 1 further comprising,
if the particular component of the software construct violates any dependency rule, refusing to build the particular component and issuing a report detailing the violation by the particular component, whereby an attempt may be made to remedy the violation based on the report.

5. The method of claim 1 further comprising:
defining the architecture to include a number of partitions;
defining the dependency rules to specify for each partition other partitions that are not to be accessed by way of the particular partition; and
assigning the particular component of the software construct to a particular partition and recording the assignment in a form accessible by a builder building the software construct based on the corresponding build instructions.

6. The method of claim 5 wherein recording the assignment comprises specifying the assignment in the build instructions.

7. The method of claim 5 wherein recording the assignment comprises specifying the assignment within the particular component.

8. The method of claim 5 wherein recording the assignment comprises specifying the assignment in a data file corresponding to the particular component.

9. The method of claim 1 comprising, for the particular component:
identifying the partition of the particular component;

reviewing the dependency rules to identify each prohibited partition based on the identified partition, whereby according to the dependency rules each component of each prohibited partition is not to be referenced by the particular component;
determining each component referenced by the particular component;
for each referenced component, determining whether the referenced component is in a prohibited partition; and
halting if a referenced component is in a prohibited partition, whereby the software construct is not built.

10. The method of claim 9 comprising halting if the partition of the particular component of the software construct cannot be identified.

11. The method of claim 1 comprising, for the particular component:
identifying the partition of the particular component;
reviewing the dependency rules to identify each prohibited partition based on the identified partition, whereby according to the dependency rules each component of each prohibited partition is not to be referenced by the particular component;
determining each component referenced by the particular component;
for each referenced component, determining whether the referenced component is in a prohibited partition and setting a violation flag if the referenced component is in a prohibited partition; and
after all identified components have been processed, determining whether the violation flag has been set, and if so, halting, whereby the particular component of the software construct is not built.

12. A computer-readable storage medium having stored thereon computer-executable instructions that when executed by a processor implement a method with regard to a computer software construct having a plurality of components and built according to an architecture designed for the construct, the architecture including a number of predefined partitions and predefined dependency rules, each partition corresponding to one of a plurality of partition strategies for having at least one component associated therewith, each dependency rule regarding whether a component of one partition may refer to any component of another partition, the method for enforcing the dependency rules of the architecture on each component of the construct as built, and comprising:

assigning each component of the plurality of components to a particular partition of the predefined partitions of each of the plurality of partition strategies using a required specifying action to specify the assignment, each component associated with one and only one partition of each of one or more of the plurality of partition strategies;

recording the assignment of each component;

receiving a command to build a particular component of the software construct based on corresponding source code, build instructions, and the predefined build instructions;

determining whether the assignment of the particular component to the particular partition is properly specified;

determining whether the particular component of the software construct and of a particular partition violates any predefined dependency rule by improperly referring to another component of another partition; and building the particular component of the software construct only if the particular component has been assigned to one and only one partition of each of one or more of the plurality of partition strategies and the assignment of the particular component is properly specified and only if the particular component violates none of the dependency rules.

13. The medium of claim 12 where the method is with regard to a software construct comprising a computer application.

14. The medium of claim 12 where the method is performed by a builder building the particular component of the software construct based on the build instructions.

15. The medium of claim 12 wherein the method further comprises the steps of:
   if the particular component of the software construct violates any dependency rule, refusing to build the particular component and issuing a report detailing the violation by the particular component, whereby an attempt may be made to remedy the violation based on the report.

16. The medium of claim 12 wherein the method comprises, for the particular component:
   identifying the partition of the particular component;
   reviewing the dependency rules to identify each prohibited partition based on the identified partition, whereby according to the dependency rules each component of each prohibited partition is not to be referenced by the particular component;
   determining each component referenced by the particular component;
   for each referenced component, determining whether the referenced component is in a prohibited partition; and
   halting if a referenced component is in a prohibited partition, whereby the software construct is not built.

17. The medium of claim 16 wherein the method comprises halting if the partition of the particular component of the software construct cannot be identified.

18. The medium of claim 12 wherein the method comprises, for the particular component:
   identifying the partition of the particular component;
   reviewing the dependency rules to identify each prohibited partition based on the identified partition, whereby according to the dependency rules each component of each prohibited partition is not to be referenced by the particular component;
   determining each component referenced by the particular component;
   for each referenced component, determining whether the referenced component is in a prohibited partition and setting a violation flag if the referenced component is in a prohibited partition; and
   after all identified components have been processed, determining whether the violation flag has been set, and if so, halting, whereby the particular component of the software construct is not built.

19. A processing device programmed to implement a method with regard to a computer software construct having a plurality of components and built according to an architecture designed for the construct, the architecture including a number of predefined partitions and predefined dependency rules, each partition corresponding to one of a plurality of partition strategies for having at least one component associated therewith, each dependency rule regarding whether a component of one partition may refer to any component of another partition, the processing device including a processor programmed to enforce the dependency rules of the architecture on each component of the construct as built by performing the steps of:
   assigning each component of the plurality of components to a particular partition of the predefined partitions of each of the plurality of partition strategies using a required specifying action to specify the assignment, each component associated with one and only one partition of each of one or more of the plurality of partition strategies;
   recording the assignment of each component;
   receiving a command to build a particular component of the software construct based on corresponding source code, build instructions, and the predefined dependency rules;
   determining whether the assignment of the particular component to the particular partition is properly specified;
   determining whether the particular component of the software construct and of a particular partition violates any predefined dependency rule by improperly referring to another component of another partition; and
   building the particular component of the software construct only if the particular component has been assigned to one and only one partition of each of one or more of the plurality of partition strategies and the assignment of the particular component is properly specified and only if the particular component violates none of the dependency rules.

20. The device of claim 19 wherein the processing device further performs the steps of:
   defining the architecture to include a number of partitions;
   defining the dependency rules to specify for each partition other partitions that are not to be accessed by way of the particular partition; and
   assigning the particular component of the software construct to a particular partition and recording the assignment in a form accessible by a builder building the software construct based on the corresponding build instructions.

* * * * *